United States Patent
Harkness et al.

(10) Patent No.: US 11,132,924 B2
(45) Date of Patent: Sep. 28, 2021

(54) HOLDER FOR A USER IDENTIFICATION BADGE AND AN ASSOCIATED METHOD

(71) Applicant: The Boeing Company, Chicago, IL (US)

(72) Inventors: William Harkness, Mukilteo, WA (US); Cynthia Dawn Murray, Auburn, WA (US)

(73) Assignee: THE BOEING COMPANY, Chicago, IL (US)

( * ) Notice: Subject to any disclaimer, the term of this patent is extended or adjusted under 35 U.S.C. 154(b) by 34 days.

(21) Appl. No.: 15/712,658

(22) Filed: Sep. 22, 2017

(65) Prior Publication Data

US 2019/0096289 A1  Mar. 28, 2019

(51) Int. Cl.
| | |
|---|---|
| *G06K 7/10* | (2006.01) |
| *G08B 25/10* | (2006.01) |
| *G09F 3/20* | (2006.01) |
| *G08B 21/02* | (2006.01) |
| *G06K 19/077* | (2006.01) |

(Continued)

(52) U.S. Cl.
CPC ......... *G09F 3/207* (2013.01); *G06K 7/10009* (2013.01); *G06K 19/07758* (2013.01);
(Continued)

(58) Field of Classification Search
None
See application file for complete search history.

(56) References Cited

U.S. PATENT DOCUMENTS 5,310,999 A * 5/1994 Claus .................... G01S 13/751
235/384
5,465,082 A * 11/1995 Chaco .................... G16H 10/65
340/539.13

(Continued)

FOREIGN PATENT DOCUMENTS

| CN | 101449142 A | 6/2009 |
| CN | 101855659 A | 10/2010 |
| CN | 106442883 A | 2/2017 |

OTHER PUBLICATIONS

*CommBadge Bluetooth wearable smartphone speaker invokes Star Trek* [online] [retrieved Oct. 27, 2017]. Retrieved from the Internet: <URL: https://newatlas.com/commbadge-wearable-bluetooth-speaker-phone/25106/#p191091>. (Jan. 18, 2012) 6 pages.
(Continued)

*Primary Examiner* — Muhammad Adnan
(74) *Attorney, Agent, or Firm* — Alston & Bird LLP

(57) ABSTRACT

A badge holding system, a holder for a user identification badge and an associated method are provided in order to provide an alert in response to the identification of one or more objects proximate the holder of the badge holding system. In relation to a holder, the holder includes a housing to receive and hold the user identification badge and a controller carried by the housing. The holder also includes a proximity identification system carried by the housing to identify one or more objects proximate the holder. The proximity identification system also provides information to the controller regarding the one or more objects that have been identified. The holder further includes an alerting output device carried by the housing and responsive to the controller. The alerting output device provides an alert in response to identification of one or more objects proximate the holder.

18 Claims, 5 Drawing Sheets

(51) Int. Cl.
*A44C 3/00* (2006.01)
*G08B 25/01* (2006.01)
*G07C 9/28* (2020.01)

(52) U.S. Cl.
CPC ............. *G08B 21/02* (2013.01); *G08B 25/10* (2013.01); *A44C 3/001* (2013.01); *G07C 9/28* (2020.01); *G08B 25/016* (2013.01)

(56) References Cited

U.S. PATENT DOCUMENTS

| | | | | |
|---|---|---|---|---|
| 5,477,215 A * | 12/1995 | Mandelbaum | ....... | G06K 7/0008 235/380 |
| 5,748,737 A * | 5/1998 | Daggar | ................ | G06K 7/0021 235/379 |
| 5,822,544 A * | 10/1998 | Chaco | .................... | G16H 40/63 705/2 |
| 5,987,438 A * | 11/1999 | Nakano | ................ | G06K 7/0013 235/375 |
| 6,031,454 A * | 2/2000 | Lovejoy | .................. | G01T 1/026 250/388 |
| 6,315,195 B1 * | 11/2001 | Ramachandran | .... | G06K 7/0004 235/380 |
| 6,769,607 B1 * | 8/2004 | Pitroda | ................ | G06K 7/0013 235/380 |
| 6,839,035 B1 * | 1/2005 | Addonisio | ......... | G06K 7/10178 340/572.1 |
| 8,648,709 B2 * | 2/2014 | Gauger | ................ | G08G 1/0962 340/539.1 |
| 8,867,867 B2 * | 10/2014 | McNeilly | ............. | G02B 6/3564 385/13 |
| 9,013,297 B1 * | 4/2015 | Dey | ........................ | G08B 21/02 340/539.11 |
| 9,336,674 B1 * | 5/2016 | Thirumalaisamy | ......................... | G06F 11/2097 |
| 9,911,290 B1 * | 3/2018 | Zalewski | ............. | G06Q 20/327 |
| 2002/0084903 A1 * | 7/2002 | Chaco | ................ | G08B 21/0288 340/573.1 |
| 2002/0084909 A1 * | 7/2002 | Stefanik | ........... | H04N 21/42202 340/4.3 |
| 2006/0044206 A1 * | 3/2006 | Moskowitz | ...... | G06K 19/07749 343/841 |
| 2006/0290519 A1 * | 12/2006 | Boate | ........................ | G07C 9/28 340/573.4 |
| 2007/0015552 A1 * | 1/2007 | Bolling | .................. | G08B 23/00 455/575.6 |
| 2007/0241901 A1 * | 10/2007 | Cage | ........................ | G06Q 50/30 340/572.1 |
| 2008/0028230 A1 * | 1/2008 | Shatford | ............... | H04L 9/3231 713/186 |
| 2008/0031838 A1 * | 2/2008 | Bolling | .................. | A61Q 19/10 424/70.1 |
| 2008/0061936 A1 * | 3/2008 | Park | .................... | G06K 7/10356 340/10.1 |
| 2009/0303005 A1 * | 12/2009 | Tuttle | ................. | G06K 7/10009 340/10.1 |
| 2010/0045464 A1 * | 2/2010 | Knopf | ..................... | E04G 21/32 340/573.1 |
| 2010/0228602 A1 * | 9/2010 | Gilvar | ................ | G06Q 30/0252 705/14.5 |
| 2010/0289662 A1 * | 11/2010 | Dasilva | .................... | F16P 3/147 340/686.6 |
| 2010/0321180 A1 * | 12/2010 | Dempsey | ................ | G16H 40/20 340/539.12 |
| 2010/0323658 A1 | 12/2010 | Lagergren | | |
| 2011/0115629 A1 * | 5/2011 | Holler | ..................... | H04L 67/22 340/572.1 |
| 2011/0133927 A1 * | 6/2011 | Humphrey | ............. | A62B 99/00 340/539.11 |
| 2011/0206378 A1 * | 8/2011 | Bolling | .................. | G16H 40/20 398/108 |
| 2012/0148120 A1 * | 6/2012 | Yagi | ..................... | G06F 16/583 382/118 |
| 2013/0021145 A1 * | 1/2013 | Boudy | ............... | G08B 13/1427 340/426.11 |
| 2013/0267171 A1 * | 10/2013 | Sarkar | ..................... | H04B 7/24 455/41.1 |
| 2014/0145847 A1 * | 5/2014 | Jenkins | .............. | G08B 13/2402 340/572.1 |
| 2014/0183269 A1 * | 7/2014 | Glaser | ................... | G06F 3/0346 235/492 |
| 2014/0327545 A1 * | 11/2014 | Bolling | ................ | G08B 21/245 340/573.1 |
| 2015/0145700 A1 * | 5/2015 | Beggs | .................... | G08G 1/005 340/944 |
| 2016/0132046 A1 * | 5/2016 | Beoughter | ......... | G05B 19/4184 700/17 |
| 2017/0220830 A1 * | 8/2017 | Schmidt | ................ | G06Q 10/087 |
| 2017/0245806 A1 * | 8/2017 | Elhawary | ............... | A61B 5/681 |
| 2017/0287311 A1 * | 10/2017 | Suryan | .................... | A45C 13/24 |
| 2017/0301039 A1 * | 10/2017 | Dyer | ....................... | H04M 1/00 |
| 2017/0374511 A1 * | 12/2017 | Buchmann | ............ | B66F 17/003 |
| 2018/0082565 A1 * | 3/2018 | Braiman | .............. | G08B 21/088 |
| 2019/0165835 A1 * | 5/2019 | Price | .................. | G06K 7/10336 |

OTHER PUBLICATIONS

*Personal Safety Devices—Security Services—261 George St, Sydney, Sydney New South Wales—Phone Number—Yelp* [online] [retrieved Oct. 27, 2017]. Retrieved from the Internet: <URL: https://www.yelp.com/au/biz/personal-safety-devices-sydney>. 2 pages.

U.S. Appl. No. 15/179,397, filed Jun. 10, 2016, In re: John W. Glatfelter entitled *Systems, Methods, and Apparatus for Sensing Environmental Conditions and Alerting a User in Response*, 38 pages.

*VCU and MCV Alumni Associations Present Police Department with 1,040 Personal Safety Devices* [online][retrieved Oct. 27, 2017]. Retrieved from the Internet: <URL: http://news.vcu.edu/article/VCU_and_MCV_Alumni_Associations_Present_Police_Department_with>. (Jan. 18, 2012) 2 pages.

Office Action for CN Application No. 2018110221352, dated May 31, 2021.

* cited by examiner

HOLDER FOR A USER IDENTIFICATION BADGE AND AN ASSOCIATED METHOD

TECHNOLOGICAL FIELD

A holder for a user identification badge is provided in accordance with an example and, more particularly, a holder for a user identification badge that provides an alert in response to the identification of one or more objects proximate the holder.

BACKGROUND

Working or other environments may include a variety of activities occurring simultaneously, for which situational awareness is desired. Such working environments, e.g., a manufacturing environment, can present unique challenges for monitoring these conditions due to the simultaneous existence of complex operations, workers and/or bystanders present in the environment, equipment within the environment, products within the environment and processes within the environment, among other things.

In order to alert others of the presence of an individual, personal safety devices have been developed that may be worn or otherwise carried by the individual. Examples of these personal safety devices include a light that repeatedly flashes to provide an indication as to the presence of the individual and/or a reflective element to similarly provide an indication of the presence of the individual in response to illumination of the reflective element. These personal safety devices are frequently attached to a bag or backpack carried by the individual or alternatively may be attached to a lanyard that is worn by the individual and carries, for example, a user identification badge of the individual. These personal safety devices are intended to alert others to the presence of the individual and provide no information or alert to the individual as to the presence of other individuals, machinery or the like. Thus, these personal safety devices rely upon others to recognize the presence of the individual, but do not provide any information or alert to the individual to give awareness of what is happening around the individual.

Additionally, the other individuals alerted by the personal safety device may be limited in that not all other individuals in proximity to the individual carrying the personal safety device will necessarily be alerted. For example, other individuals may be located around a corner or behind a door or other obstacle relative to the personal safety device and, as a result, may not be alerted by the personal safety device even though the individual carrying the personal safety device is in the near proximity. Also, in instances in which the personal safety device is clipped to a backpack worn by an individual, other individuals who are behind the individual carrying the personal safety device may be alerted, but other individuals including those in front of the individual carrying the personal safety device and, therefore, in the path of travel of the individual carrying the personal safety device may not be alerted even though those other individuals in the path of travel of the individual carrying the personal safety device may be more likely to interact with an individual carrying the personal safety device. Additionally, in instances in which a personal safety device is carried by or otherwise incorporated within a lanyard, many individuals may elect to clip their user identification badge to their clothing and, as a result, may not wear a lanyard, thereby limiting the individuals who may take advantage of a lanyard-based personal safety device.

Also, the personal safety devices generally just announce the presence of the individual and do not provide any other information, such as information regarding any emergency conditions, such as a medical emergency, a security situation or the like. Thus, the functionality of such personal safety devices is limited.

BRIEF SUMMARY

A badge holding system, a holder for a user identification badge and an associated method are provided in accordance with an example in order to provide an alert in response to the identification of one or more objects proximate the holder of the badge holding system. The alert that is provided serves to alert the user of the badge holding system such that the user is made aware of the nearby object(s), thereby enabling the user to proactively take action to avoid an incident with the nearby object(s). The badge holding system, the holder for a user identification badge and the associated method of one example also permit an alarm signal to be transmitted along with a location of the badge holding system, such as in response to user input, in order to permit medical personnel, security personnel or the like, to be dispatched, thereby further increasing the functionality of the badge holding system and the safety of the user.

In an example, a holder is provided for a user identification badge. The holder includes a housing configured to receive and hold the user identification badge and a controller carried by the housing. The holder also includes a proximity identification system, such as a radio frequency identification device (RFID) tag, carried by the housing and configured to identify one or more objects proximate the holder. The proximity identification system is also configured to provide information to the controller regarding the one or more objects that have been identified. The holder further includes an alerting output device carried by the housing and responsive to the controller. The alerting output device is configured to provide an alert in response to identification of one or more objects proximate the holder.

The alerting output device of an example includes one or more of the following: one or more lights configured to provide a visible alert, one or more speakers configured to provide an audible alert or a vibration source configured to provide a vibratory alert. The holder of an example also includes a location tracking system carried by the housing and configured to determine a location of the holder. The holder of this example can also include a wireless transmitter carried by the housing and an emergency alarm input device carried by the housing and responsive to user input in order to signal the controller. The controller, in turn, is configured to cause the wireless transmitter to transmit an alarm signal along with the location of the holder. The holder of an example also includes an energy storage device carried by the housing that is configured to store energy harvested from kinetic movement of the holder. The holder of an example also includes an electromagnetic shield carried by the housing and positioned between the proximity identification system and the user of the holder.

In another example, a badge holding system is provided that includes a user identification badge and a holder including a housing configured to receive and hold the user identification badge. The holder also includes a proximity identification system carried by the housing and configured to identify one or more objects proximate the housing. The holder further includes an alerting output device carried by the housing and configured to provide an alert in response to identification of one or more objects proximate the holder.

The holder of an example also includes a badge identification system configured to identify the user of the user identification badge. In this example, the user identification badge and the holder may each include a respective badge identification system configured to inform the holder of an identity of the user of the user identification badge. The holder of an example also includes a location tracking system carried by the housing and configured to determine a location of the holder. In this example, the holder may also include a wireless transmitter carried by the housing and an emergency alarm input device carried by the housing and responsive to user input so as to cause the wireless transmitter to transmit an alarm signal along with the location of the holder. The holder of an example also includes an electromagnetic shield carried by the housing and positioned between the proximity identification system and the user of the badge holding system.

In a further example, a method is provided for alerting a user having a user identification badge. The method includes holding the user identification badge in a housing of a holder. The method also includes identifying one or more objects proximate the holder with a proximity identification system, such as a radio frequency identification device (RFID) tag, carried by the housing. The method further includes providing information to a controller carried by the housing regarding the one or more objects that have been identified. The method additionally includes causing an alerting output device carried by the housing to provide an alert in response to identification of one or more objects proximate the holder.

The alerting output device of an example includes one or more of the following: one or more lights configured to provide a visible alert, one or more speakers configured to provide an audible alert or a vibration source configured to provide a vibratory alert. The method of an example also includes determining a location of the holder with a location tracking system carried by the housing. The method of this example may also include receiving user input via an emergency alarm input device carried by the housing in order to signal the controller and causing a wireless transmitter to transmit an alarm signal along with the location of the holder. The method of an example also includes storing energy harvested from kinetic movement of the holder. The method of an example also includes at least partially electromagnetically shielding the user with an electromagnetic shield carried by the housing and positioned between the proximity identification system and the user.

BRIEF DESCRIPTION OF THE DRAWINGS

Figure 1:
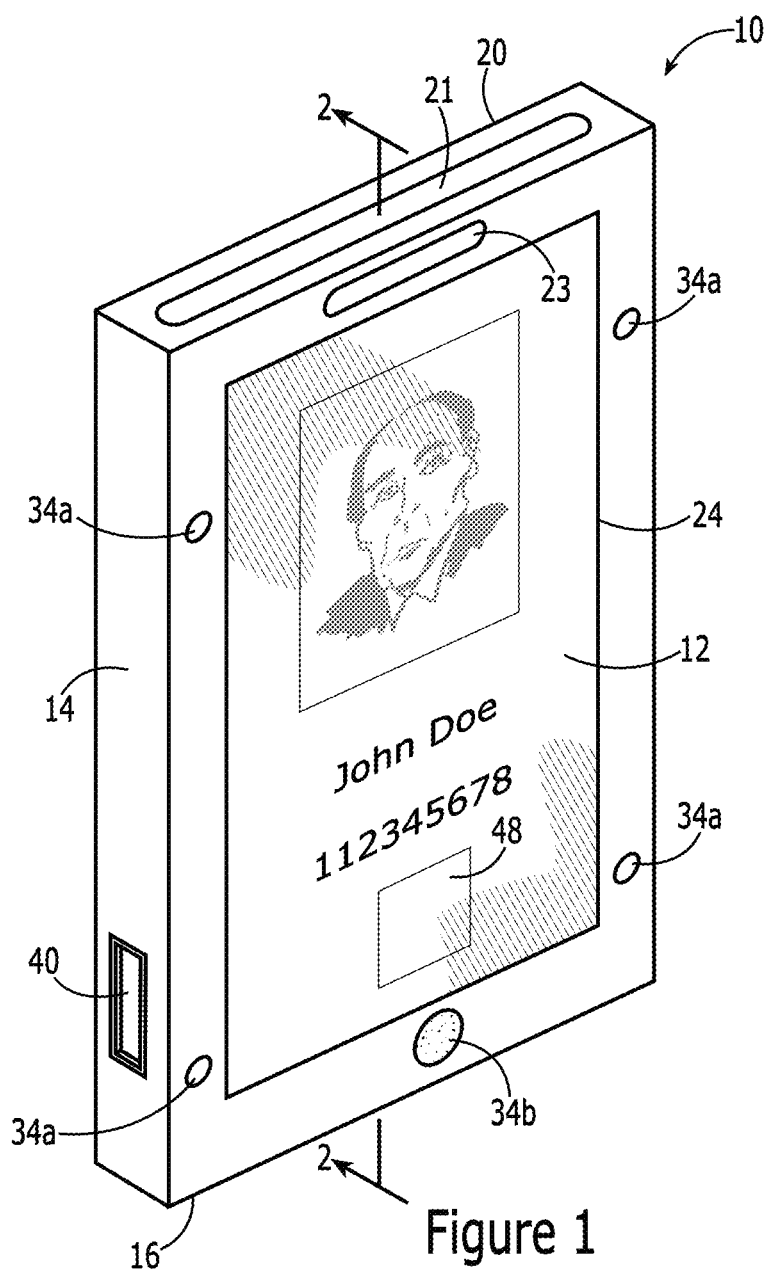
Figure 2:
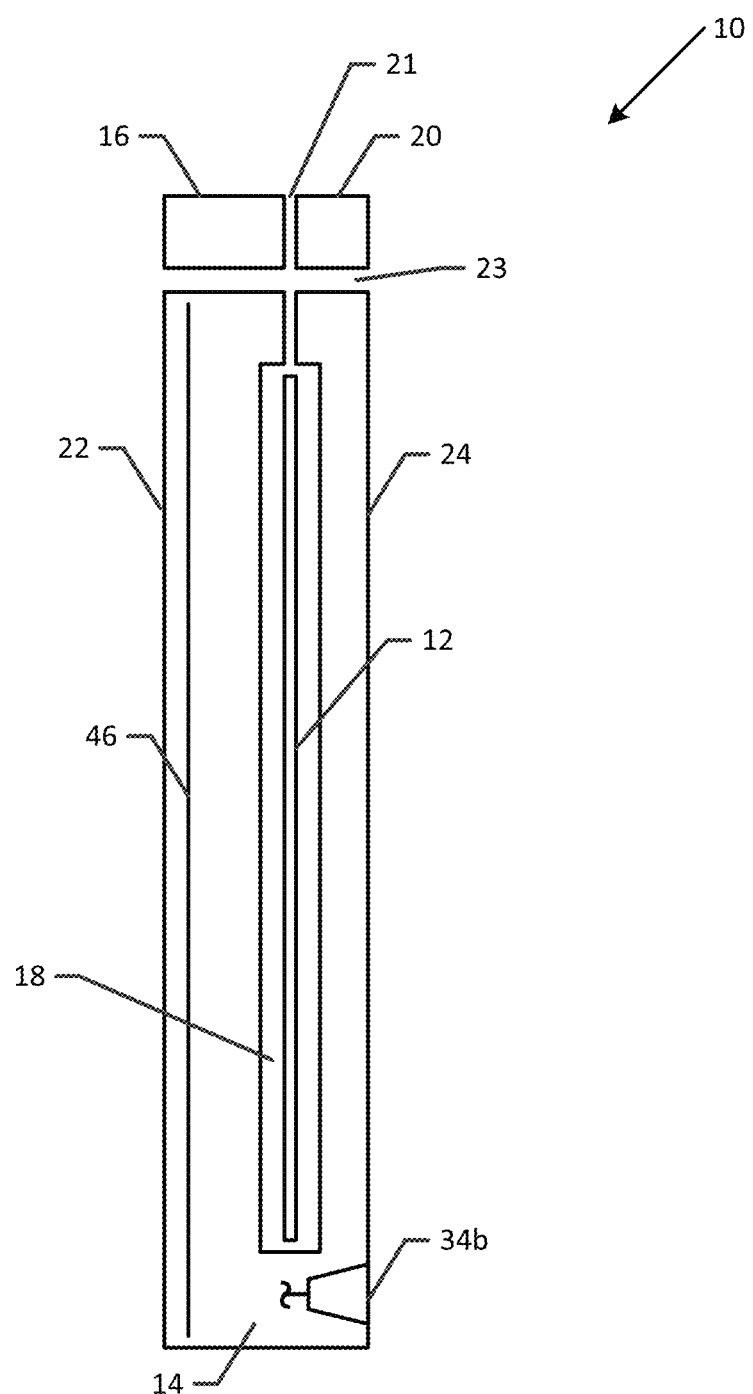
Figure 3:
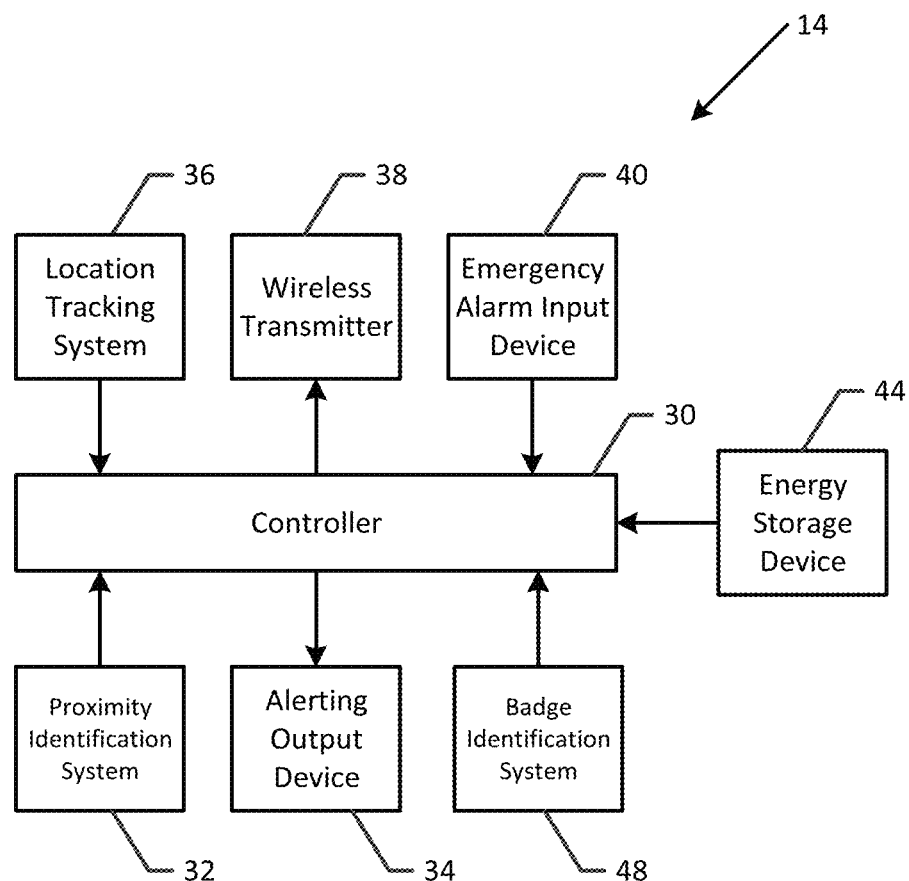
Figure 4:
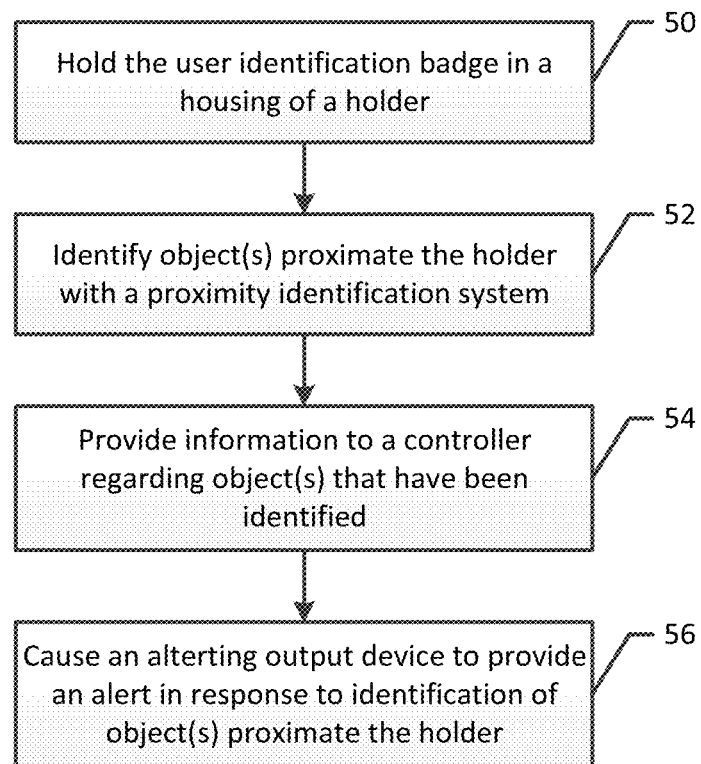
Figure 5:
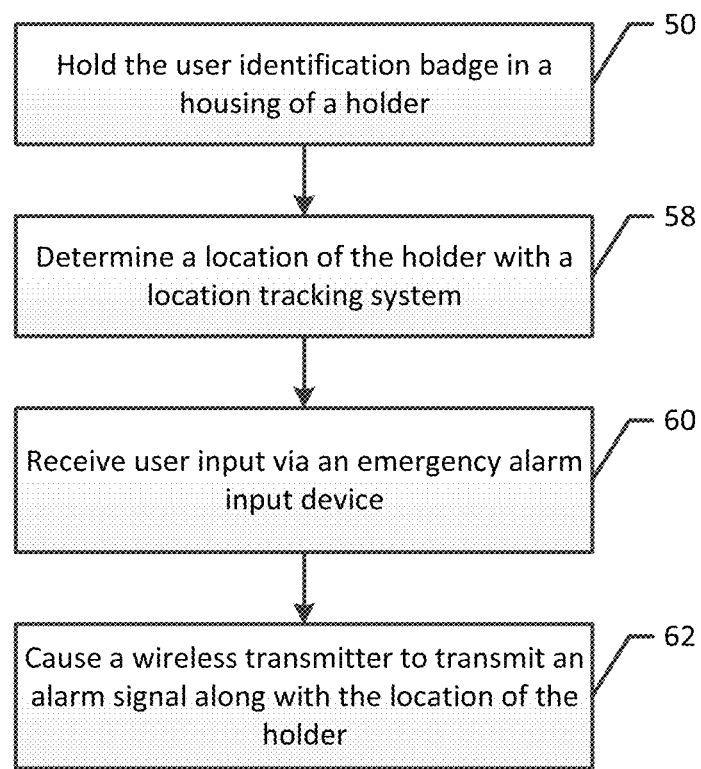

Having thus described examples of the present disclosure in general terms, reference will now be made to the accompanying drawings, which are not necessarily drawn to scale, and wherein:

FIG. 1 is a perspective view of a badge holding system including a user identification badge and a holder in accordance with an example of the present disclosure;

FIG. 2 is a side view of a badge holding system taken along line 2-2 of FIG. 1 and including a holder having an electromagnetic shield carried by the housing in accordance with an example of the present disclosure;

FIG. 3 is a block diagram of a holder for a user identification badge in accordance with an example of the present disclosure;

FIG. 4 is a flowchart of the operations performed generally by a badge holding system, such as shown in FIGS. 1 and 2, and more particularly by a holder, such as shown in FIG. 3, in accordance with an example of the present disclosure; and FIG. 5 is a flowchart of the operations performed generally by a badge holding system, such as shown in FIGS. 1 and 2, and more particularly by a holder, such as shown in FIG. 3, in accordance with another example of the present disclosure.

DETAILED DESCRIPTION

Some examples of the present disclosure will now be described more fully hereinafter with reference to the accompanying drawings, in which some, but not all, examples are shown. Indeed, various examples may be embodied in many different forms and should not be construed as limited to the examples set forth herein; rather, these examples are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with examples of the present disclosure. Thus, use of any such terms should not be taken to limit the spirit and scope of examples of the present disclosure.

Referring now to FIG. 1, a badge holding system 10 in accordance with an example is depicted. The badge holding system includes a user identification badge 12 and a holder 14 configured to receive and hold the user identification badge. The user identification badge generally identifies the user who wears or otherwise carries the badge holding system. In this regard, the badge holding system may be attached to a lanyard and hung around the neck of the user, may include a clip or other attachment mechanism for being secured to an article of clothing of the user or may be worn or carried by the user in other manners. Although the badge holding system and the user identification badge carried thereby may be employed in a variety of different contexts with the user identification badge potentially providing different types of information regarding the user depending upon the context, the badge holding system of an example is utilized in a work environment to identify the user. As such, the user identification badge may identify the user as an employee, a contractor, a vendor, a visitor or the like. Although the user identification badge may take various forms and, as such, may have various shapes and sizes, the user identification badge of an example is a generally rectangular card which may include indicia regarding the user, such as the user name, an employee or other identification number, a photo of the user or the like.

The holder 14 may include a housing 16 configured to receive and hold the user identification badge 12. Although the housing may be configured in various manners, the housing of one example has a form factor that generally matches, but is slightly larger than, the user identification badge. As shown in FIG. 2, the housing of this example also defines an internal cavity 18 opening through a slit 21 in a side wall, such as the upper side wall 20, of the holder and sized to receive the user identification badge therethrough. Thus, the user identification badge may be slipped into the internal cavity defined by the housing through the slit, such as defined by the upper side wall of the housing.

In one example and as shown in FIG. 2, the housing 16 includes a base 22 that underlies the user identification badge 12 and a window or other covering 24 that overlies the user identification badge with the internal cavity 18 therebetween. The window or other covering may be transparent or translucent such that the user identification badge is visible therethrough. For example, the window or other covering may be a transparent or translucent plastic material through which the user identification badge is visible. The housing of an example includes a mechanism for securing the user identification badge within the internal cavity 18 once the user identification badge has been inserted thereinto. For example, a slot 23 may be defined through an upper portion of the housing proximate the upper side wall 20 with the slot extending through both the window or other covering as well as the base of the housing. A clip may be inserted through the slot following the insertion of the user identification badge into the internal cavity defined by the housing. The clip, in turn, may be attached to an article of clothing of the user or may be attached to or form a portion of a lanyard. In either instance, the clip extends across the slit 21 defined by the upper side wall of the housing and prevents the user identification badge from being withdrawn from the internal cavity defined by the housing until the clip has been disconnected from the housing, thereby temporarily but securely retaining the user identification badge within the holder 14.

The holder 14 of the badge holding system 10 not only includes a housing 16 to receive and hold the user identification badge 12, but includes a number of additional components to provide added functionality, including the provision of alerts in response to the identification of one or more objects proximate the holder. As shown in FIG. 3, the holder of an example includes a controller 30 carried by the housing. In this regard, the controller may be attached to the housing, such as the base 22 of the housing, or may be embedded or otherwise disposed within the base of the housing. The controller may be embodied in various manners, including as one or more of various hardware processing means such as a coprocessor, a microprocessor, a microcontroller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. In some examples, the controller may be configured to execute instructions stored in a memory device or otherwise accessible to the controller. The memory device may be an electronic storage device (e.g., a computer readable storage medium) comprising gates configured to store data (e.g., bits) that may be retrievable by a machine (e.g., a computing device like the controller). The memory device may be configured to store information, data, content, applications, instructions, or the like for enabling the controller to carry out various functions in accordance with an example of the present disclosure. For example, the memory device could be configured to store instructions for execution by the controller. Alternatively, the controller may be configured to execute hard coded functionality.

The holder 14 of the example depicted in FIG. 2 also includes a proximity identification system 32 carried by the housing 16 and configured to identify one or more objects proximate the holder. As with the controller 30, the proximity identification system may be attached to the housing, such as the base 22 of the housing, or embedded or otherwise disposed within the base of the housing. The proximity identification system may be embodied in various manners. For example, the proximity identification system may include a radio frequency identification device (RFID) tag.

The RFID tag may interact with one or more RFID tags carried by other objects in the proximity of the holder, and through this interaction may identify the one or more other objects. In this regard, the identification of the one or more other objects proximate the holder may be the identification of the presence of one or more objects proximate the holder or more specific identification, including the identification of the specific identity, such as by name, number, or the like, of one or more objects in the proximity of the holder.

The proximity identification system 32 is configured to identify various objects proximate the holder 14. These objects may include other people as well as machinery. In an example in which the proximity identification includes an RFID tag, any other type of objects that is also carrying an RFID tag may be identified, including other people wearing a badge holding system 10 which includes a corresponding RFID tag. Further, the object(s) that are identified by the proximity identification system need not be visible to the user, but may be around a corner, behind a door or other obstacle or otherwise out of the field of view of the user, so long as the object(s) are proximate the holder as defined by the operable range of the proximity identification system and are therefore able to be detected by the proximity identification system. In one example, an object is considered proximate the holder in an instance in which the object is within the operable range of the proximity identification system. Alternatively, in another example in which the proximity identification system and/or the controller 30 is configured to identify the physical distance between the holder and an object, the object is considered proximate the holder in an instance in which the object is within a predefined distance of the holder.

Upon identification of one or more objects proximate the holder 14, the proximity identification system 32 is also configured to provide information to the controller 30 regarding the one or more objects that have been identified. This information may identify the presence of the one or more objects and, in some examples, may more particularly provide identification of the one or more objects.

The holder 14 of an example also includes an alerting output device 34 carried by the housing 16 and responsive to the controller 30. As with the controller and the proximity identification system 32, the alerting output device may be attached to the housing, such as the base 22 of the housing, or may be embedded or otherwise disposed within the base of the housing. The alerting output device is configured to provide an alert in response to identification of one or more objects proximate the holder. Various types of alerts may be provided. For example, the alerting output device may include one or more lights 34*a*, such as one or more light emitting diodes (LEDs) as shown in FIG. 1, configured to provide a visible alert. Additionally or alternatively, the alerting output device may include one or more speakers 34*b* configured to provide an audible alert. Additionally or alternatively, the alerting output device may include a vibration source configured to provide a vibratory alert. Thus, in response to the identification of one or more objects proximate the holder, the controller of an example is configured to cause the alerting output device to provide an alert, such as a visible alert, an audible alert and/or a vibratory alert.

The alert notifies the user of the user identification badge 12 such that the user may proactively take action to avoid any incident with the object(s) in proximity to the holder 14. For example, in response to the alert, the user may slow down and look around a corner or behind a door prior to moving ahead in order to avoid a potential collision. In addition to alerting the user, the alert provided by the alerting output device 34 may also alert other individuals in proximity to the user, such as other individuals who may see the visible alert and/or hear the audible alert, and who may also take action to avoid any incident with the user.

The holder 14 can also include a location tracking system 36. The location tracking system is carried by the housing 16, such as by being attached to the base 22 of the housing, or embedded or otherwise disposed within the base of the housing. The location tracking system is configured to determine a location of the holder and, as a result, the user. The location tracking system may be embodied in various manners. For example, the location tracking system may include a global positioning system (GPS) sensor for determining a relatively precise location of the user. Alternatively, the location tracking system may include a wireless communication system, such as a Wi-Fi communication system, such that by determining the Wi-Fi networks that are available for connection and referencing the locations associated with each of the Wi-Fi networks, the location tracking system is able to identify the general location of the user.

In an example that includes a location tracking system 36, the holder 14 also includes a wireless transmitter 38 carried by the housing 16, such as by being attached to the base 22 of the housing or embedded or disposed within the base of the housing. The wireless transmitter may operate in accordance with any of a variety of different wireless communication protocols, including cellular communication protocols, Wi-Fi communication protocols, wireless local area network (WLAN) communication protocols or the like. The holder of this example also includes an emergency alarm input device 40 carried by the housing and responsive to user input in order to signal the controller 30. In this example, the emergency alarm input device is embodied by a button, switch or other input device that is operably attached to and is movable relative to the housing in response to actuation by the user, such as in response to an emergency condition, e.g., a health-related emergency condition, a safety-related emergency condition or the like. Once the controller is signaled in response to the user input to the emergency alarm input device, the controller is configured to cause the wireless transmitter to transmit an alarm signal, along with the location of the holder. The location of the holder may be determined by the location tracking system in response to the user input. Alternatively, the location of the holder may be repeatedly determined by the location tracking system and stored, for example, by the controller or a memory device in communication therewith such that the location may be readily retrieved in response to the user input. The alarm signal may be transmitted to a predefined recipient, such as health care personnel, safety personnel or the like. As such, personnel may be dispatched to the location of the user in order to address the emergency condition identified by the user.

Although the emergency alarm input device 40 may be configured to be responsive to user input as described above, the emergency alarm input device of other examples need not receive user input, but may be actuated by predefined conditions. For example, the holder 14 may include one or more sensors, such as an accelerometer, a pressure sensor, a temperature sensor or the like. In instances in which the parameter measured by the sensor(s) is determined by the controller 30 to exceed or fail to satisfy a predefined threshold, the emergency alarm input device is driven by the controller to issue a signal that, in turn, causes the wireless transmitter 38 to transmit an alarm signal. In this example, the controller may embody the emergency alarm input device as a result of its analysis of the parameter(s) measured by the sensor(s) relative to predefined threshold(s). As such, the emergency alarm input device of this example is configured to identify an emergency condition even in an instance in which the user is unable to or otherwise fails to provide input.

The holder 14 may include additional functionality in some examples. For example, the holder may include a flashlight for providing illumination, such as in response to user input.

The holder 14 of an example also includes an energy storage device 44, such as a battery. The energy storage device provides power to the active components, such as a controller 30, the proximity identification system 32, the location tracking system 36, the wireless transmitter 38 and the like. While the energy storage device may be embodied in various manners, the energy storage device of an example may include a rechargeable battery. In this example, the holder may define a port, such as a Universal Serial Bus Type C (USB-C) port, for charging the energy storage device. Alternatively or additionally, the energy storage device may be configured to store energy harvested from kinetic movement of the holder. In this example, the energy storage device may be embodied by a piezo transducer configured to store energy harvested from kinetic movement of at the holder.

The holder 14 can also include an electromagnetic shield 46. The electromagnetic shield can be formed, for example, of a foil, such as aluminum foil layer, and may be carried by the housing 16. The electromagnetic shield is positioned between one or more components of the holder that emit electromagnetic energy and the user of the holder. For example, the electromagnetic shield may be positioned between the the controller 30, the proximity identification system 32, the location tracking system 36 and/or the wireless transmitter 38 of the holder and the user of the holder. Although the electromagnetic shield may be carried by the housing in various manners, the electromagnetic shield may be embedded within the housing, such as the base 22 of the housing as shown in FIG. 2, or may be attached to, such as adhesively attached to, a rear surface of the housing, that is, the rear surface of the base of the housing, that faces the user and is opposite the user identification badge 12.

In operation and as shown in block 50 of FIG. 4, the user identification badge 12 is held in the housing 16 of a holder 14 with the resulting badge holding system then being worn by the user, such as by being carried by a lanyard worn by the user or by being attached, such as clipped, to an article of clothing worn by the user. As shown in block 52 of FIG. 4, one or more objects proximate the holder are identified with the proximity identification system 32 carried by the housing. The proximity identification system then provides information to the controller 30 regarding the one or more objects that have been identified. See block 54. An alerting output device 34 is then caused by the controller to provide an alert in response to the identification of one or more objects proximate the holder. See block 56. As such, the user may then take appropriate action to avoid an unintended incident with the one or more objects proximate thereto.

Concurrent with the identification of object(s) proximate the holder 14 and while the user identification badge 12 is held in a housing 16 of the holder as shown in block 50 of FIG. 5, the location of the holder is determined by a location tracking system 36. See block 58 of FIG. 5. In response to receipt of user input via an emergency alarm input device 40 as shown in block 60, the controller 30 is signaled and a wireless transmitter 38 is caused to transmit an alarm signal, along with the location of the holder. See block 62 of FIG. 5. As such, emergency responders, such as medical personnel, security personnel or the like, may be dispatched to the location of the holder in order to respond to the emergency faced by the user.

Throughout the process depicted in FIG. 3, the components of the holder 14 may be supplied power by an energy storage device 44. In one example, the method further includes storing energy harvested from kinetic movement of the holder. Additionally, the method of an example includes electromagnetically shielding the user with an electromagnetic shield 46 carried by the housing 16 and positioned between at least the proximity identification system 32 and the user.

As such, the user of a badge holding system 10 may be alerted as to the presence of one or more objects in the proximity of the user. The user may then proactively take steps to avoid an undesired incident with the one or more objects, thereby increasing the safety of the user. Additionally, the badge holding system 10, the holder 14 and the associated method may provide for the issuance of an alarm signal coupled with the location of the holder in order to permit emergency conditions faced by the user to be readily addressed, thereby further increasing the safety of the user.

The holder 14 can also include a badge identification system 48 configured to identify the user of the user identification badge 12. The badge identification system may be embodied in various manners. In one example, both the user identification badge and the holder each include a respective badge identification system configured to inform the holder of the identity of the user of the user identification badge. In this example, both the user identification badge and the holder may include an RFID tag that identifies the user of the user identification badge to the holder. Alternatively, the badge identification system of the holder may include a sensor for recognizing indicia carried by the user identification badge that identifies the user of the user identification badge. For example, the badge identification system of the holder may include a scanner configured to read and interpret a code, such as a bar code, a quick response (QR) code or the like, carried by the user identification badge and serving to identify the user of the user identification badge.

By identifying the user of the user identification badge 12 in accordance with this example, the holder 14 and, more particularly, the controller 30 may apply any user-specific functionality. For example, depending upon the role served by different user, different predefined thresholds may be established for use by an emergency alarm input device 40 in order to identify an emergency condition. Additionally, the wireless transmitter 38 may provide the identity of the user of the user identification badge along with the alarm signal and the location of the holder in response to the identification of an emergency condition, such as based upon user input. In such an instance in which an emergency alarm is transmitted, the personnel that are dispatched not only know the location of the badge holding system 12, but also the identity of the user. As such, in an instance of a medical emergency, the medical personnel may be better prepared to respond to the emergency condition based upon the medical history or the medical information associated with the user of the user identification badge who has now been identified by the badge identification system 48 of this example.

Many modifications and other examples of the present disclosure set forth herein will come to mind to one skilled in the art to which the examples pertain having the benefit of the teachings presented in the foregoing descriptions and the associated drawings. Therefore, it is to be understood that the present disclosure is not to be limited to the specific examples disclosed and that modifications and other examples are intended to be included within the scope of the appended claims. Moreover, although the foregoing descriptions and the associated drawings describe examples in the context of certain example combinations of elements and/or functions, it should be appreciated that different combinations of elements and/or functions may be provided by alternative examples without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A holder for a user identification badge, the holder comprising:
    a housing configured to receive and hold the user identification badge, wherein the housing defines an internal cavity and a slot in the housing providing access to the internal cavity, and wherein the user identification badge is received into the internal cavity through the slot in the housing;
    a controller carried by the housing;
    a proximity identification system carried by the housing and configured to identify one or more objects based on their respective name or identification proximate the holder and to provide information to the controller regarding the one or more objects that have been identified, wherein the proximity identification system comprises a radio frequency identification device (RFID) tag, and wherein the proximity identification system is configured to determine a physical distance between the holder and the one or more objects; and
    an alerting output device carried by the housing and responsive to the controller, wherein the alerting output device is configured to provide an alert in response to identifying the one or more objects proximate the holder being within a predefined distance of the holder to alert a user of a presence of the one or more objects within the predefined distance of the holder to enable the user to take proactive action, and wherein the controller provides for an alert to the one or more objects.

2. The holder according to claim 1 wherein the alerting output device comprises one or more of the following: one or more lights configured to provide a visible alert, one or more speakers configured to provide an audible alert or a vibration source configured to provide a vibratory alert.

3. The holder according to claim 1 further comprising a location tracking system carried by the housing and configured to determine a location of the holder.

4. The holder according to claim 3 further comprising: a wireless transmitter carried by the housing; and an emergency alarm input device carried by the housing and responsive to user input in order to signal the controller, wherein the controller is configured to cause the wireless transmitter to transmit an alarm signal along with the location of the holder.

5. The holder according to claim 1 further comprising an energy storage device carried by the housing and configured to store energy harvested from kinetic movement of the holder.

6. The holder according to claim 1 further comprising an electromagnetic shield carried by the housing and positioned between the proximity identification system and the user of the holder.

7. A badge holding system comprising:
a user identification badge; and
a holder comprising:
a housing configured to receive and hold the user identification badge, wherein the housing defines an internal cavity and a slot in the housing providing access to the internal cavity, and wherein the user identification badge is received into the internal cavity through the slot in the housing;
a controller carried by the housing;
a proximity identification system carried by the housing and configured to identify one or more objects proximate the holder, wherein the proximity identification system comprises a radio frequency identification device (RFID) tag, and wherein the proximity identification system is configured to determine a physical distance between the holder and the one or more objects; and
an alerting output device carried by the housing and configured to provide an alert in response to identifying the one or more objects proximate the holder being within a predefined distance of the holder to alert a user of a presence of the one of more objects within the predefined distance of the holder to enable the user to take proactive action, and wherein the controller provides for an alert to the one or more objects.

8. The badge holding system according to claim 7 wherein the holder further comprises a badge identification system configured to identify a user of the user identification badge.

9. The badge holding system according to claim 8 wherein the user identification badge and the holder each comprise a respective badge identification system where the holder is informed of an identity of the user of the user identification badge of the user.

10. The badge holding system according to claim 7 wherein the holder further comprises a location tracking system carried by the housing and configured to determine a location of the holder.

11. The badge holding system according to claim 10 wherein the holder further comprises: a wireless transmitter carried by the housing; and an emergency alarm input device carried by the housing and responsive to user input so as to cause the wireless transmitter to transmit an alarm signal along with the location of the holder.

12. The badge holding system according to claim 7 wherein the holder further comprises an electromagnetic shield carried by the housing and positioned between the proximity identification system and the user of the badge holding system while not compromising the proximity identification system functionality.

13. A method for alerting a user having a user identification badge, the method comprising:
holding the user identification badge in a housing of a holder, wherein the housing defines an internal cavity and a slot in the housing providing access to the internal cavity, and wherein the user identification badge is received into the internal cavity through the slot in the housing;
identifying one or more objects based on their respective name or identification proximate the holder with a proximity identification system carried by the housing, wherein the proximity identification system comprises a radio frequency identification device (RFID) tag, and wherein the proximity identification system is configured to determine a physical distance between the holder and the one or more objects;
providing it to a controller carried by the housing regarding the one or more objects that have been identified; and
causing an alerting output device carried by the housing to provide an alert in response to identifying the one or more objects proximate the holder being within a predefined distance of the holder to alert a user of a presence of the one of more objects within the predefined distance of the holder to enable the user to take proactive action, and wherein the controller provides for an alert to the one or more objects.

14. The method according to claim 13 wherein the alerting output device comprises one or more of the following: one or more lights configured to provide a visible alert, one or more speakers configured to provide an audible alert or a vibration source configured to provide a vibratory alert.

15. The method according to claim 13 further comprising determining a location of the holder with a location tracking system carried by the housing.

16. The method according to claim 15 further comprising: receiving user input via an emergency alarm input device carried by the housing in order to signal the controller; and causing a wireless transmitter to transmit an alarm signal along with the location of the holder.

17. The method according to claim 13 further comprising storing energy harvested from kinetic movement of the holder.

18. The method according to claim 13 further comprising electromagnetically shielding the user with an electromagnetic shield carried by the housing and positioned between the proximity identification system and the user.

* * * * *